Jan. 10, 1967   J. H. KAUFFMAN   3,297,366
APPARATUS FOR FEEDING AND TRANSPORTING MATERIALS
Filed June 30, 1965   2 Sheets-Sheet 1

INVENTOR.
JOHN H. KAUFFMAN
BY Mason, Kolehmainen,
Rathburn & Wyss.
ATTORNEYS

INVENTOR.
JOHN H. KAUFFMAN
BY Mason, Kolehmainen,
Rathburn & Wyss.
ATTORNEYS 3,297,366
APPARATUS FOR FEEDING AND
TRANSPORTING MATERIALS
John H. Kauffman, Crystal Lake, Ill., assignor, by mesne assignments, to National Engineering Company, Chicago, Ill., a corporation of Delaware
Filed June 30, 1965, Ser. No. 468,345
4 Claims. (Cl. 302—17)

The present invention relates to a new and improved apparatus for feeding and transporting materials and, more particularly, relates to new and improved apparatus for delivering a metered quantity of solid material for pneumatic conveying transport to other locations.

In many manufacturing installations, such as foundries and the like, it is desirable to feed a metered quantity of foundry sand or bonding material from a storage bin or large supply hopper for distribution to a mixer or other equipment at remote locations. The material is transported from the feeding station through a fluid delivery tube or duct by means of compressed air supplied from a high volume blower. Because the air supplied to the system is under pressure, it is desirable to depressurize the system as the material is introduced to prevent blowback into the storage bin, and it is also desirable to close the communication between the supply bin and the system when the system is pressured. It is also desirable to provide means for preventing the material from clogging or plugging the system during periods of shut-down or depressurization and, further, to prevent material from backblowing into the blower or source of compressed fluid.

It is therefore an object of the present invention to provide a new and improved apparatus for feeding and transporting materials which is capable of accomplishing the above objectives in an efficient and economical manner.

More specifically, it is an object of the present invention to provide a new and improved apparatus for delivering metered quantities of solid materials for pneumatic conveying to various remote locations.

Yet another object of the present invention is the provision of a new and improved pneumatic material delivery system in which the system is depressurized during the feeding of a metered batch of solid material from a storage bin into the system for later transport to a distant location.

Still another object of the present invention is the provision of a new and improved apparatus of the type described having means to prevent plugging of the apparatus during periods of shut-down or depressurization.

Yet another object of the present invention is the provision of a new and improved apparatus for feeding material having a sealed feed hopper in communication with a delivery system, means for intermittently supplying metered quantities of material to said hopper from a storage bin and means for moving the batch of material from the feed hopper to a distant location.

Still another object of the present invention is the provision of a new and improved apparatus of the type described wherein the means for feeding material into the hopper is shut down and closed off from the hopper during the period when pressurized fluid is introduced to carry the material in the feed hopper to the desired location.

A further object of the present invention is the provision of a new and improved apparatus of the type described including a completely sealed feeding hopper which is expansible to adjust the volume thereof.

Another object of the present invention is the provision of a new and improved apparatus of the type described including a feed hopper wherein the distance between the fluid inlet to the hopper and the opening of the delivery conduit is selectively adjustable to provide the desired feed rates of material out of the feed hopper.

Still another object of the present invention is the provision of a new and improved feed hopper with a fluid inlet orifice therein including means for closing the inlet during periods of shut down and feeding of material into the hopper to prevent plugging or clogging of the orifice and prevent the material from moving into the fluid blower.

The foregoing and other objects and advantages of the present invention are accomplished by the provision of a new and improved apparatus for feeding and transporting materials comprising a sealed feed hopper for containing a batch of said materials to be transported and having inwardly tapering sidewalls converging to encircle a fluid inlet opening or orifice adjacent the lower end thereof. A material delivery tube extends downwardly into the sealed hopper and includes an open inlet mouth centered over and spaced above the orifice. A fluid supply chamber is positioned beneath the hopper in communication with the orifice and is provided with an inlet for receiving compressed fluid from a convenient source. Valve means are provided to control the movement of pressurized fluid into the orifice and the valve means are movable between an orifice closing and an orifice opening position. A material feeder is positioned to supply metered quantities of material to the feed hopper from a storage bin or the like at selected intervals. The feeder is operable to close the feeding outlet thereof for maintaining the hopper in sealed condition when no material is being fed. Means are provided for actuating the feeder and orifice valve means in selected synchronous relation with one another, wherein the feeder outlet is closed when the valve means is open to move material from the hopper out the delivery tube and wherein the valve means is closed when the feeder is delivering a new batch of material to the hopper.

For a better understanding of the invention, reference should be had to the following detailed description taken in conjunction with the drawings, in which.

Figure 1:
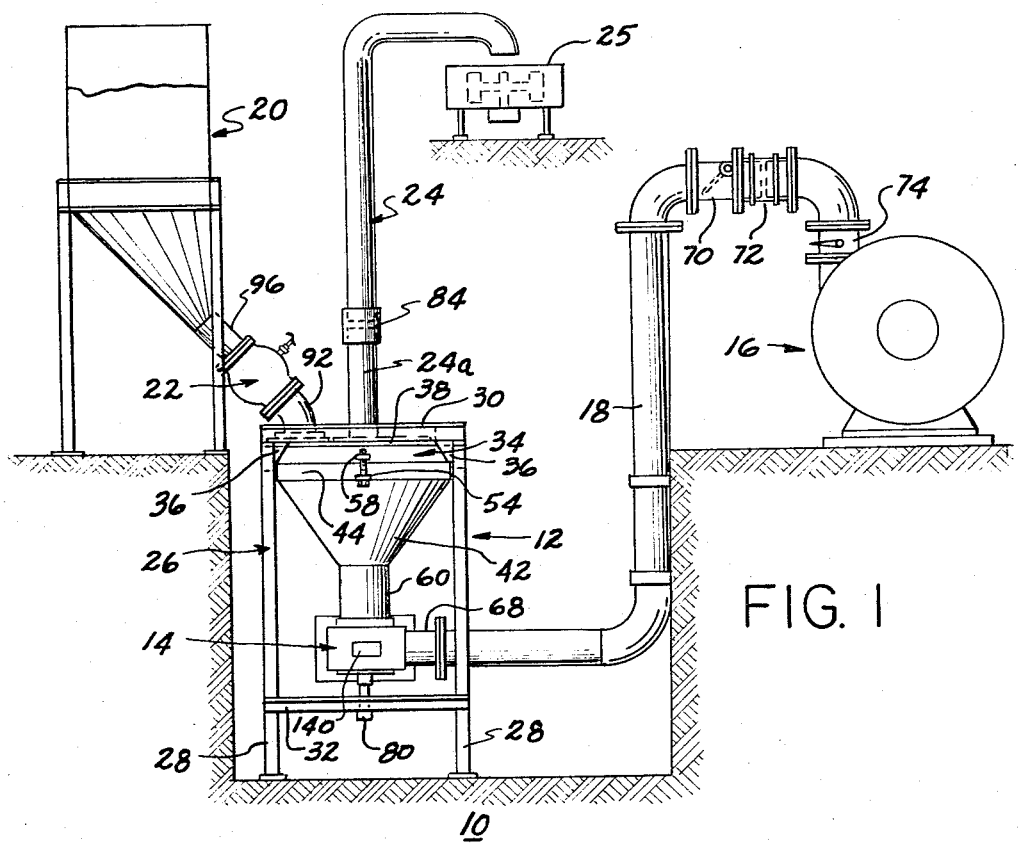
FIG. 1 is a side elevational view of one embodiment of a material feeding and transporting system constructed in accordance with the present invention.

Referring now to the drawings, therein is illustrated a new and improved apparatus for feeding and transporting materials constructed in accordance with the features of the present invention and referred to generally by the reference numeral 10. The apparatus 10 includes a feeding hopper 12 having a fluid chamber 14 at the lower end thereof which is connected to a source of compressed fluid, such as a high volume air blower 16 through an inlet pipe 18. Material is supplied to the feeding hopper 12 from a storage bin 20 through a material feeder 22 and is delivered from the feed hopper upwardly through a fluid delivery duct 24 for distribution to various remote locations to be used, for instance, in a mixer 25.

The feeding hopper 12 is supported on a frame structure 26 comprising a plurality of vertical legs 28 tied together with upper and lower cross members 30 and 32. The hopper includes a fixed top closure assembly 34 supported on the legs 28 by welded gussets 36. The top closure assembly 34 includes a circular top plate or cover 38 having a depending annular angle ring 40 secured to the lower surface thereof. The lower portion of the hopper includes an inwardly and downwardly tapering conical wall section 42 joined to an upper circular wall or band 44 which is dimensioned to telescope inside the depending flange of the angle ring 40 on the fixed top closure assembly 34.

Clearance space is provided between the outer surface of the band 44 and the inner surface of the fixed depending flange 40 in order to accommodate a rope-type sealing gasket 46 wound in several rings around the band 44. The gasket 46 maintains an airtight seal between the fixed top closure assembly 34 and the movable lower portion of the hopper, and permits vertical movement of the latter to effect changes in hopper volume and clearance between the lower end or inlet mouth of the delivery tube 24 and conical wall section 42. Compressive forces are maintained against the rope gasket by means of a fixed upper retaining ring 48 secured to the band 44 and an adjustable lower compression ring 50 secured around the band 44 just below the lower end of the depending flange of the fixed angle ring 40. The ring 50 comprises several arcuate sections connected together with bolts 52 (FIG. 2) to clamp the ring tightly in place around the band 44, while permitting vertical adjustment of the lower portion of the hopper.

The lower portion of the hopper 12 is suspended from the fixed top closure 34 by a plurality of threaded cap screws 54 which extend upwardly through supporting lugs 56 spaced around the band 44, and vertical adjustment of the lower portion of the hopper is made by tightening or loosening the cap screws. The screws are threaded into a plurality of lugs 58 secured to the depending flange of the angle ring 40, and tightening or loosening the screws will cause the lower portion of the hopper to move upwardly or downwardly in relation to the top closure. Once the screws 54 have been adjusted as desired, the lower compression ring 50 is secured tightly in place around the band 44 to compress the rope seal gasket 46 and effect a tight seal between the upper and lower portions of the hopper 12.

The lower end of the hopper 12 is provided with an inlet opening 42a to provide an inlet for the introduction of pressurized fluid into the hopper to carry the material therein upwardly in the delivery tube 24. A cylindrical casing 60 is secured to the conical wall 42 and depends downwardly therefrom to support an annular baseplate 62 which carries a convergent nozzle 64 positioned between the inlet opening 42a and the baseplate. The nozzle 64 includes an open lower end which is aligned with a central opening in the baseplate 62, and the nozzle walls are tapered inwardly and upwardly toward the upper end, forming an outlet orifice 64a coaxially aligned with the delivery tube 24. The internal bore of the nozzle 64 is accurately machined and finished to provide for a smooth acceleration of pressurized fluid passing upwardly therethrough.

The fluid chamber 14 for supplying fluid to the nozzle is bolted to the lower face of the base flange 62 and includes an inlet fitting 68 on one of the sidewalls, which is flangedly connected to the fluid supply line 18. The fluid supply line 18 includes a check valve 70 for preventing reverse flow from the fluid chamber to the air blower 16, and a flexible pressure-tight coupling 72 is provided to accommodate vertical movements of the fluid chamber relative to the blower caused by adjustment of the hopper.

A blast gate valve 74 is interconnected between the fluid inlet line 18 and the outlet of the air blower 16 to adjust the outlet pressure and volume of fluid into the system.

Figure 2:
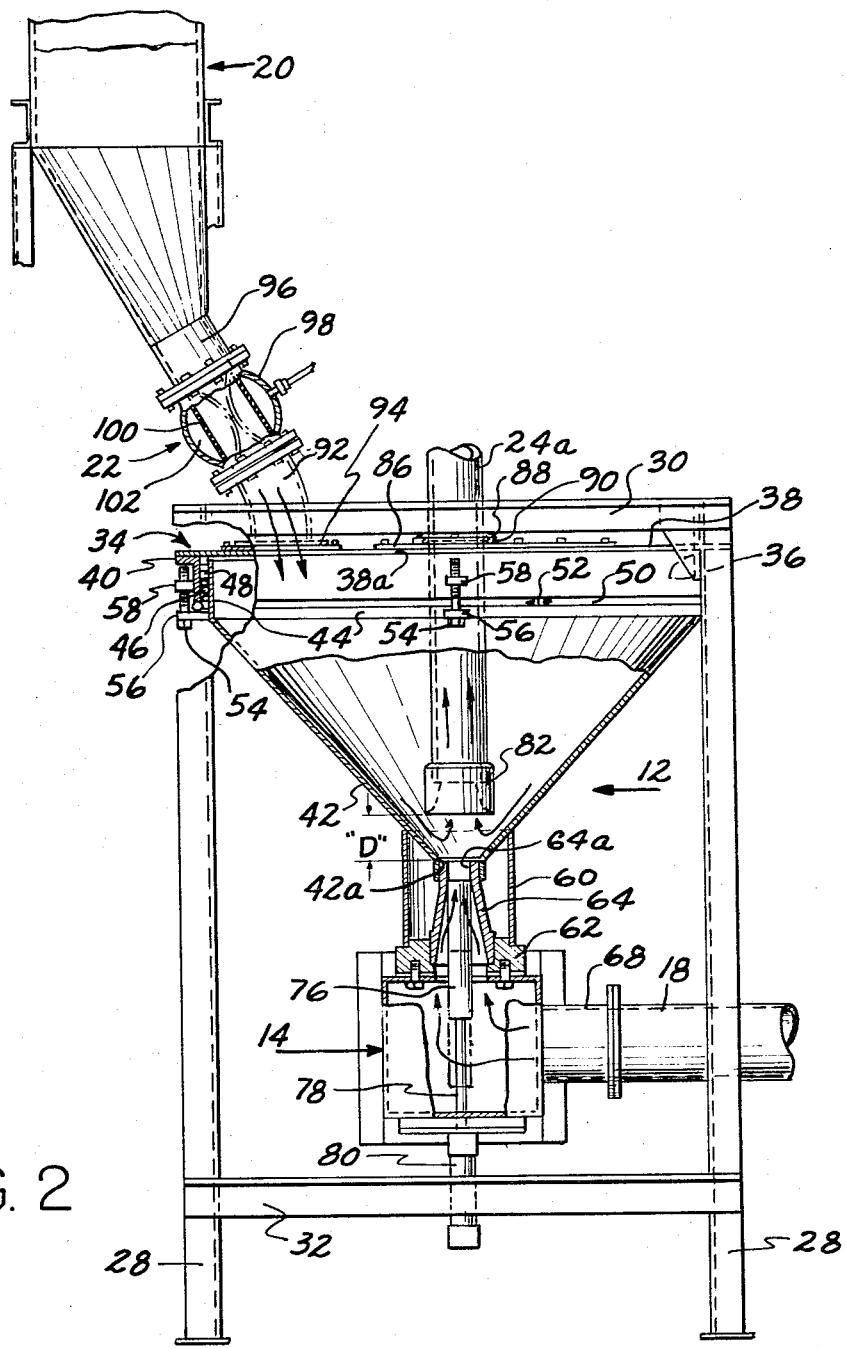
FIG. 2 is an enlarged elevational view of the material feeding apparatus of FIG. 1 with portions broken away to show internal details.

In order to control the flow of pressurized fluid upwardly from the fluid chamber 14 through the nozzle 64 into the interior of the hopper 12, a rodlike valve member 76 is positioned for vertical reciprocal movement along the nozzle axis between an orifice closing position and a lower retracted or fully open position. When the valve 76 is in the orifice closing position, as shown in FIG. 2 in solid lines, fluid flow into the hopper from the fluid chamber is completely shut off and material in the hopper is prevented from plugging or clogging the nozzle and fluid chamber. When the valve is moved downwardly to the fully open position shown in broken lines in FIG. 2, maximum fluid flow is permitted upwardly from the fluid chamber 14 through the nozzle 64 into the hopper 12, and intermediate positions of the valve 76 permit selection of the flow rates into the hopper 12. In order to move the valve between selected positions, the lower end thereof is connected to the upper end of a piston rod 78 which extends upwardly from a fluid cylinder 80 mounted below the fluid chamber. The cylinder 80, valve 76, nozzle 64, and delivery tube 24 are coaxially aligned along a common vertical axis extending centrally upward through the hopper 12 resulting in a smooth upward flow of fluid and material.

The lower end of the delivery tube 24 is provided with an annular entrance nozzle or mouth 82 having inwardly tapered inner wall surfaces which smoothly join the inner wall of the delivery tube. When the hopper 12 contains a batch of material and the valve 76 is opened, pressurized fluid from the fluid chamber 14 moves upwardly through the nozzle orifice 64 entraining quantities of material and carrying the material upwardly in the delivery tube. One of the controlling factors in determining the feed rate of material from the hopper into the delivery tube 24 is the clearance distance "D" between the lower end of the mouth 82 and the upper end or orifice 64a of the nozzle 64. Thus, by reducing the distance "D," the feed rate is reduced, and by increasing the distance "D," the feed rate of material into the delivery tube 24 is increased.

When the materials being fed are highly abrasive, wearing action on the inlet fitting 82 becomes severe and replacement is sometimes necessary. Also, replacement of the lower portion of the delivery tube 24 itself may become necessary, and for this reason a coupling 84 is provided in the line above the hopper 12 to connect the upper portion of the delivery tube with a replaceable lower end section 24a. The section 24a extends downwardly through an enlarged opening 38a in the top plate 38 of the hopper, and a removable cover plate 86 is provided to seal the opening 38a yet permit access to the interior of the hopper when the cover is removed. The section 24a extends through an aperture in the cover and is sealed and connected thereto by means of an annular seal plate 88 secured to the upper surface of the cover. The annular seal plate 88 includes an internal O-ring seal 90 bearing inwardly against the tube 24a to provide a sealed connection between the tube and cover and still permit vertical movement of the tube in relation thereto. Adjustment of the nozzle clearance distance "D" can also be accomplished by threading the lower end section 24a upwardly or downwardly with respect to the coupling 84. This action is desirable to obtain minor changes in the clearance distance without having to raise or lower the entire lower portion of the hopper 12 and fluid chamber 14.

As the accelerated fluid moves upwardly through the divergent portion of the nozzle 64 flowing out of the orifice 64a at high velocity, material in the hopper is entrained within a fluid stream and moved upwardly through the mouth 82 into the delivery tube. As the material is carried up the delivery tube, more material in the hopper flows downwardly along the conical wall 42 into the region immediately below the mouth 82 and is carried up the delivery duct. When all of the material in the hopper has been transported through the delivery duct, there is little resistance to the flow of fluid in the duct, and the pressure of the fluid within the chamber begins to decrease. The decreasing pressure may be utilized as a controlling factor for initiating the movement of the valve 76 to close the orifice 64a in the nozzle.

Metered batches of material contained in the storage bin 20 are directed into the hopper 12 through a pinch-type feeder 22. The lower end of the feeder 22 is connected to a flanged elbow 92 and the elbow is supported on a removable cover plate 94 attached to the top plate 38 of the hopper. The upper end of the feeder 22 is connected to an outlet 96 extending downwardly from the storage bin 20. The feeder 22 is formed with a central casing 98 having connecting flanges on opposite ends thereof. Within the central casing a tubular sleeve 100 of flexible material, such as rubber or plastic, is mounted within the casing and the ends of the sleeve are secured to the flange end of the feeder. The casing wall is enlarged intermediate the ends to provide an outer pressure chamber 102 around the sleeve. When air pressure is applied to the chamber 102 in the casing, the flexible sleeve 100 is compressed inwardly and pinched together, as shown in broken lines in FIG. 2, to shut off the flow of material therethrough. When the air pressure in chamber 102 is relieved, the resilient sleeve 100 returns to its original position, permitting material to flow through the feeder into the hopper 12. The pinching action of the sleeve seals off communication between the storage bin and hopper 12 so that pressurized air in the hopper does not flow upwardly into the storage bin. When the sleeve is in a relaxed or open position, material in the bin is free to flow downwardly through the feeder into the hopper. The amount of each batch of material flowing from the storage bin to the hopper is controlled by the length of time that the flexible sleeve is open and, by varying this time interval, the quantity of material in each batch can be selected as desired.

Figure 3:
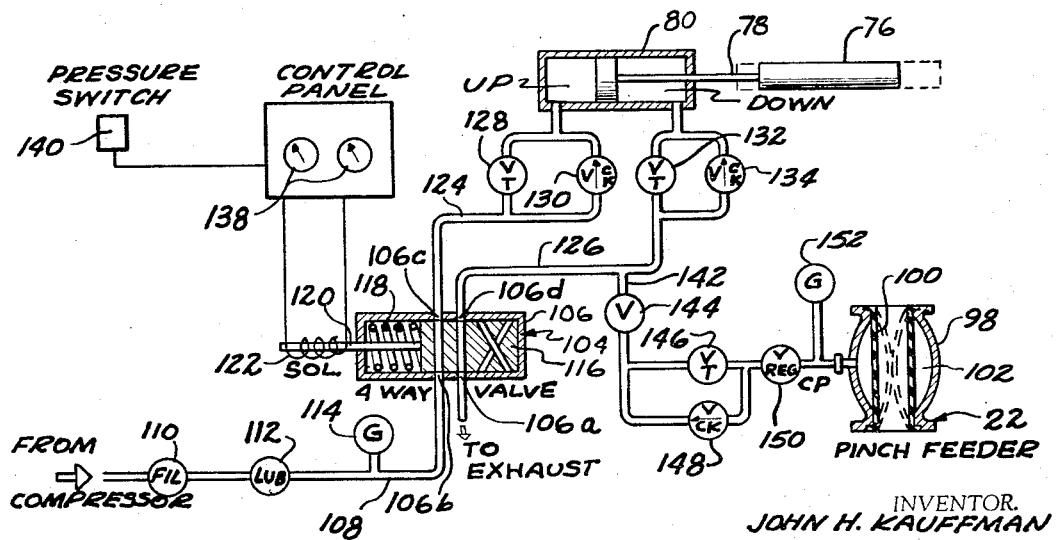
FIG. 3 is a schematic diagram of one embodiment of a pneumatic control system for the system of FIG. 1.

A control system for actuating the pinch feeder 22 and valve cylinder 80 in synchronous relation to one another is illustrated schematically in FIG. 3. The system includes a solenoid-operated, spring-return, four-way valve 104 having an outer casing 106 provided with an exhaust port 106a and inlet port 106b connected to a source of compressed air, such as an air compressor through a supply line 108. A filter 110 and lubricator 112 are connected in the inlet line 108 to filter and lubricate the air supply to the control system, and a pressure gauge 114 is provided for indicating the pressure supplied to the system. The valve 104 includes a reciprocating plunger 116 slidable within the casing 106 and biased towards one end thereof by the compression spring 118. An operating rod 120 is connected to one end of the plunger 116 and extends through the casing 106 into an electrical solenoid coil 122. The casing 106 of the valve includes a first outlet port 106c in line with the inlet port 106b, and a second outlet port 106d in line with the exhaust port 106a. When the solenoid 122 is not energized, the compression spring 118 moves the plunger 116 to the position shown in FIG. 3, wherein a first pair of passages in the plunger are aligned to connect the inlet port 106b to the first outlet port 106c, and the second outlet port 106d to the exhaust port 106a.

The first outlet port 106c is connected to the lower end or upside of the cylinder 80 via a line 124, and the second outlet port 106d is connected to the upper end of the cylinder or downside by a line 126. A throttle valve 128 and check valve 130, connected in parallel, are provided in the line 124 to control fluid flow into and out of the upside of the cylinder and, likewise, a throttle valve 132 and check valve 134 in parallel are provided in the line 126 running to the downside of the cylinder.

When pressurized air is supplied to the upside of the cylinder, the fluid flows freely through the check valve 130 causing the piston and rod 78 to move upwardly to close the valve member 76. As this occurs, fluid in the downside of the cylinder cannot pass through the check valve 134 to the line 126 and must flow out of the cylinder through the throttle valve 132. The throttle valve 132 is adjusted to restrict the flow of fluid out of the cylinder at a metered rate and thus provide a cushioning effect against upward movement of the piston. Likewise, when pressurized fluid is supplied to the downside of the cylinder through the line 126, the fluid flows freely through the check valve 134 into the cylinder but fluid in the upside of the cylinder cannot pass out through the check valve 130 and must flow through the throttle valve 128 at a metered rate providing a cushioning effect against downward movement of the piston which opens the valve member 76. When the solenoid 122 is de-energized, the plunger 116 is moved to the left (FIG. 3) against the spring 118 into a reversing position wherein a second pair of passages in the plunger are aligned to interconnect the exhaust port 106a with the first outlet port 106c and the inlet port 106b with the second outlet port 106d.

With the plunger 116 in the reversing position, pressurized fluid is directed into the downside of the cylinder 80 and the upside of the cylinder is connected to the exhaust port 106a. As this occurs, the piston rod 78 moves downwardly, opening the valve member 76 to permit fluid in the fluid chamber 14 to flow upwardly through the nozzle 64 and orifice 64a thereof into the hopper 12 and move the material therein upwardly into the delivery tube 24. After all of the material has been moved out of the hopper into the delivery duct, the solenoid is de-energized and the spring 118 returns the valve plunger 116 to its original position and the valve member 76 then moves upwardly to the orifice closing position. When the valve member is in the orifice closing position, material cannot flow into the fluid chamber 14 or inlet line 18 to the blower 16, and plugging or clogging of these components and the nozzle 64 and its outlet orifice 64a is prevented. This is an extremely advantageous feature because, after periods of prolonged shutdown, many materials tend to pick up moisture and cake or crust over, and it is difficult to remove such materials when the apparatus is started up again.

The solenoid 122 is energized from an electrical control panel 136 having one or more electric timers 138 associated with the circuitry thereof. The timers can be set to energize the solenoid for selected time intervals and then maintain the solenoid in a de-energized condition for selected time intervals. The solenoid 122 may also be de-energized to actuate the valve member 76 to an orifice closing position in response to the fluid pressure in the inlet chamber. For this purpose, a pressure-sensitive switch 140 is mounted on a wall of the chamber 14 and is adjusted to energize the control panel circuitry for de-energizing the solenoid any time the pressure in the fluid chamber falls below a selected level. Accordingly, should the air blower 16 become inoperative for any reason, causing a reduction in fluid chamber pressure below the selected level, the valve member 76 would close automatically to plug the orifice 64a and prevent material from entering the nozzle, fluid chamber, and fluid inlet line 18.

During normal operations when the valve member 76 is open and fluid flow is moving the material in the hopper 12 upwardly through the delivery duct 24, the material in the hopper causes a back pressure to exist in the fluid chamber which is above the selected pressure level of the pressure switch 140.

After all of the material is moved out of the hopper 12 into the delivery tube 24, very little obstruction to fluid flow is present and, accordingly, the back pressure in the fluid chamber 14 falls below the selected pressure level of the pressure switch 140, causing the solenoid 122 to be de-energized and the valve member 76 to close the orifice 64a, initiating a new cycle.

In order that the pinch feeder 22 may be controlled in synchronous relation with the opening and closing of the valve member 76, the line 126 is also connected to the inlet of the control chamber 102 of the feeder via a branch line 142, as shown in FIG. 3. A hand-operated, shutoff valve 144 is provided in the branch line 142 to permit pressurized fluid to be entrapped in the feeder chamber 102, maintaining the feeder in the pinched-off or closed position for periods of time, such as overnight shutdowns when there is a quantity of material contained in the storage bin 20. It is desirable to feed all of the material out of the storage bin 20 before a period of prolonged shutdown of the apparatus to prevent the feeder from being maintained in a pinched-off condition; however, the valve 144 provides means for so maintaining the feeder should it become necessary.

In order to control the flow of pressurized fluid into and out of the chamber 102 of the feeder 22, a throttle valve 146 and check valve 148 are connected in parallel relation with each other in the feeder branch line 142. Fluid flow into the feeder moves through the throttle valve 146 and can be adjusted to provide for gradually closing or pinching off of the flexible sleeve 100. Flow out of the feeder to the exhaust port 106a passes through the check valve 148 with little restriction, providing for rapid opening of the pinched-off sleeve to permit immediate feeding of material through the feeder into the hopper.

It should be noted from the diagram of FIG. 3 and the above description that the feeder 22 is actuated to open and feed material into the hopper only when the valve 76 is in orifice closing position, and this prevents high pressure fluid from moving upwardly through the feeder from the hopper 12 to the storage bin 20 during feeding operation of the feeder. When the valve member 76 is moved to an open position permitting fluid flow upwardly through the nozzle 64 from the fluid chamber 14 into the hopper, the chamber 102 of the pinch feeder is pressurized to close or pinch off the sleeve 100 so that the pressurized flow into the hopper will carry the material therein out of the delivery tube 24 and will not pass upwardly through the feeder 22 into the storage bin. Because the operating pressures needed for actuation of the feeder are generally less than that needed for operation of the cylinder 80, a pressure-regulating valve 150 is provided and a pressure gauge 152 is utilized to aid in adjusting the feeder pressure gauge to provide the desired operating pressure.

When the apparatus of the present invention is utilized for delivering metered batches of material, such as sand or bonding materials for foundry sand, to a remotely located mixer 25, the timers 138 of the control panel circuitry are set to provide a selected time interval during which the pinch feeder 22 is open and feeding into the hopper and the quantity of the batch is controlled thereby. The pinch feeder is closed off after the elapsed time and a metered quantity of material is in the hopper 12 ready for delivery to the mixer through the duct or delivery tube 24. The valve member or plunger 76 then opens for a selected period of time, also set by one of the timers 138 if desired, and fluid from the blower 16 and fluid chamber moves upwardly through the nozzle 64 into the hopper 12, carrying the batch of material therein upwardly through the delivery tube 24 for discharge into the mixer. The flow rate of material from the hopper into the delivery tube is controlled by adjusting the nozzle clearance "D" and this can be accomplished by tightening or loosening of the hopper cap screws 54 to lower or raise the lower portion of the hopper. Adjustments in the clearance distance "D" can also be accomplished by means of the coupling 84 as previously described. After a metered batch of material in the hopper 12 has been delivered through the delivery tube 24 to its destination, the pressure switch 140 senses the reduction in back pressure in the fluid chamber 14 and closes the valve member 76, initiating a new cycle. When the valve member 76 is closed, the pinch feeder 22 is opened to feed the next batch of material from the bin 20 into the hopper 12 and the process is repeated.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for feeding and transporting materials comprising a sealed feed hopper for containing a batch of said material having a lower member including inwardly tapering wall portions converging to encircle an inlet orifice adjacent the lower end thereof, said hopper including an upper member movable toward and away from said lower member and seal means for sealingly interconnecting said upper and lower members, a material delivery tube extending downwardly into said hopper having an inlet mouth centered over and spaced upwardly from said orifice, a fluid supply chamber below said hopper in communication with said orifice having an inlet adapted for connection to a source of pressurized fluid, valve means in said supply chamber movable between an orifice closing position and an open position permitting fluid flow from said supply chamber through said orifice for transporting material in said hopper upwardly in said delivery tube, material feeder means having an outlet in communication with said hopper operable to feed metered batches of material into said hopper at selected intervals and to close said outlet between said intervals, and control means for actuating said feeder and valve means in selected synchronous relation wherein said feeder outlet is closed when said valve means is open and said valve means is in orifice closing position when said feeder is feeding material into said hopper.

2. Apparatus as defined in claim 1 wherein said hopper includes adjustable supporting means for moving said upper and lower members toward and away from one another.

3. Apparatus as defined in claim 1 wherein said upper and lower members include a pair of spaced apart telescoping sections, said seal means including gasket means interposed between said sections and means for compressing said gasket means to tightly seal between said telescoping sections.

4. Apparatus for feeding and transporting materials comprising a closed feed hopper for containing said material having a lower member including inwardly tapering wall portions converging to encircle an inlet orifice adjacent the lower end thereof, said hopper including an upper member movable toward and away from said lower member and seal means for connecting said upper and lower members, a material delivery tube extending downwardly into said hopper having an inlet mouth centered over and spaced upwardly from said orifice, a fluid supply chamber below said hopper in communication with said orifice having an inlet adapted for connection to a source of pressurized fluid, valve means in said supply chamber movable between an orifice closing position and an open position permitting fluid flow from said supply chamber through said orifice for transporting material in said hopper upwardly in said delivery tube, said valve means including axially movable plunger means slidable into and out of said orifice, fluid operated material feeder means having an outlet in communication with said hopper operable to feed metered quantities of material into said hopper at selected intervals and close said outlet between said intervals, and operator means for actuating said feeder and valve means in selected synchronous relation wherein said feeder outlet is closed when said valve means is open and said valve means is in orifice closing position when said feeder is feeding material into said hopper, said operator means including fluid cylinder and piston means mounted on said supply chamber, said piston means being reciprocally movable in said cylinder means and connected to move said plunger means between said orifice closing and open position.

References Cited by the Examiner

UNITED STATES PATENTS

| | | | |
|---|---|---|---|
| 1,339,977 | 5/1920 | Pruden | 302—53 |
| 2,604,246 | 7/1952 | Hood | 302—64 |
| 2,668,085 | 2/1954 | Baresch | 302—53 |
| 2,678,240 | 5/1954 | Snow | 302—53 |

ANDRES H. NIELSEN, *Primary Examiner.*